April 26, 1960

W. D. MacGEORGE 2,934,751

APPARATUS FOR EFFECTING AUTOMATIC BATCHING OF COMPOSITE MIXTURES

Filed May 7, 1957

INVENTOR
William D. MacGeorge
BY
Frank H. Borden
ATTORNEY

United States Patent Office 2,934,751
Patented Apr. 26, 1960

2,934,751

APPARATUS FOR EFFECTING AUTOMATIC BATCHING OF COMPOSITE MIXTURES

William D. Macgeorge, North Wales, Pa., assignor, by mesne assignments, to The Howe Scale Company, Rutland, Vt., a corporation of Delaware Application May 7, 1957, Serial No. 657,639

5 Claims. (Cl. 340—199)

This invention relates to circuits for automatic control of a plurality of sequential steps or operations, in which the completion of one step initiates the next succeeding step.

An illustrative application of the invention is in the art of automatic batching, wherein it is desired to successively weigh predetermined weights of respective ingredients of a related series of plural ingredients of a common batch, as a continuous or semi-continuous operation. While in this illustrative utilization it will be seen that it is primarily concerned with the control of fluent materials, whether liquids or solids, the flow of which can be controlled by valves, gates and the like, it will be understood that in its broader aspects the system can be used for the sequential control of successive machine tool operations and the like, wherein each operation is accompanied by incremental motion of a common element.

In the U.S. application of William D. Macgeorge, Serial No. 280,240, filed April 3, 1952, now eventuated into Patent No. 2,801,874, there was disclosed a system for effecting automatic batching of ingredients of composite batch mixtures, utilizing a series of voltage bridges, each formed by a differential transformer common to all bridges and of which the secondaries, in aiding relation with a common connection brought out form two legs of all bridges, with the other two legs of each bridge formed by the respective ends of an instantly coupled potentiometer, the slider arm of which formed with the common connection the bridge output. In operation the voltage bridge was predeterminedly unbalanced by adjustment of the arm of the instantly coupled potentiometer, providing a bridge output signal, a desired weight of an ingredient was applied to the weigh beam which displaced the armature of the differential transformer, inducing a signal in the secondaries, which ultimately brought the bridge signal to null or no signal, and the attainment of this condition stopped the supply of the given ingredient when the desired weight thereof on the weigh beam was attained, and also synchronously disconnected one potentiometer from the common differential transformer and connected another thereto, with its arm at a predetermined setting, and the unbalanced signal from the new voltage bridge thus formed started the supply of another ingredient to the weigh beam or the like.

While generally satisfactory, this voltage bridge organization incorporated certain difficulties which the present invention overcomes. These difficulties were:

(1) The small differential voltage change in the voltage bridge caused by the displacement of the differential transformer armature required that relatively large side resistors had to be connected in series with the bridge balancing potentiometer to permit this potentiometer to cover the exact range of the system. Since it is difficult to procure potentiometers which are adequately linear in low ohmic ranges and since the values of these side resistors is normally 3 to 4 times the value of the potentiometer a circuit impedance of well over 1500 ohms is usually used. This resulting relatively high impedance entails the use of high input impedance amplifiers and electronic relays which use is detrimental where long transmission lines may be required. It also introduces certain harmonics which are detrimental to the system operation.

(2) In systems requiring long transmission distances the effect of temperature on the connecting cables (which form part of the resistive portion of the bridge circuit) will affect the range of the system to a certain extent.

It is among the objects of the invention to improve upon the circuitry and performance of the invention of said application; to improve measuring circuits; to provide a measuring circuit adjustable to measure a given amount of a given material, as a component or ingredient of a batch of materials, with means for easily and accurately varying the amount thereof to be measured; to provide control means operated as a function of a control circuit condition for initiating the movement of a material from a supply to a weigh chamber, and to shut off said supply when a predetermined value of said material in the weigh chamber has been effected; to provide a batching circuit in which a plurality of independent materials are successively moved in measured quantities into a weigh chamber for immediate or ultimate mixing, controlled by plural independently adjustable circuits, each of which predetermines the quantity of related material introduced into the weigh chamber, with means for varying the relative proportions of the respective materials; to improve methods of batching; to provide an apparatus in which batch data is stored, for selective use for batching; to improve electrical control systems; to provide an instant and inertialess means for controlling the feed of the various materials into a weigh chamber in accordance with the weight of and in said weigh chamber; to provide a circuit of low impedance for batching; to provide a control circuit for batching and the like using a Wheatstone bridge powered by the output of a range coil with a condition responsive signalling device in the output circuit of the bridge; to provide a control circuit comprised of a voltage divider in which the common connection brought out is an output lead to a signal responsive device, such as a relay, and a signalling transformer responsive to variations in condition connects at one end to an end of the voltage divider and the other forms the other input to the signal responsive device, whereby when used in batching the adjustment of the circuit is from zero in a scale head; to provide a circuit for effecting sequential control of a plurality of operations to provide a control circuit utilizing the bucking secondaries of a differential transformer in series with the output leads of a voltage divider; and many other objects and advantages of the invention will become more apparent as the description proceeds.

In the accompanying drawings, forming part of this description:

In the complete circuitry according to the invention, there is provided a plurality of potentiometers the slidable contact of each of which is manually adjustable and settable to predetermine the weight of a given ingredient of a batch or the condition of any variable, and each successive potentiometer of the series is brought into the operative circuit as the applied weight of one ingredient or the condition of one variable attains that which is predetermined by the preceding potentiometer of the series.

In an illustrative example, of batching by weight for instance, let it be assumed that there is a scale organization having a scale head element movable proportionally to applied weight on the scale or weigh beam (not shown, but common in the art). It is desired to deposit a predetermined weight of fluent material on the scale, as the first ingredient of the batch, to have the attainment of the predetermined weight on the scale shut off the first ingredient supply and synchronously to initiate the deposit of a predetermined weight of a second fluent material on the scale, and to have the attainment of the second predetermined weight thereon terminate the supply thereof, and to initiate the deposit of a third predetermined weight on the scale, etc., through n ingredients. For illustrative purposes let it be assumed that the control of three ingredients, will illustrate the apparatus and method, while simplifying the disclosure.

Figure 1:
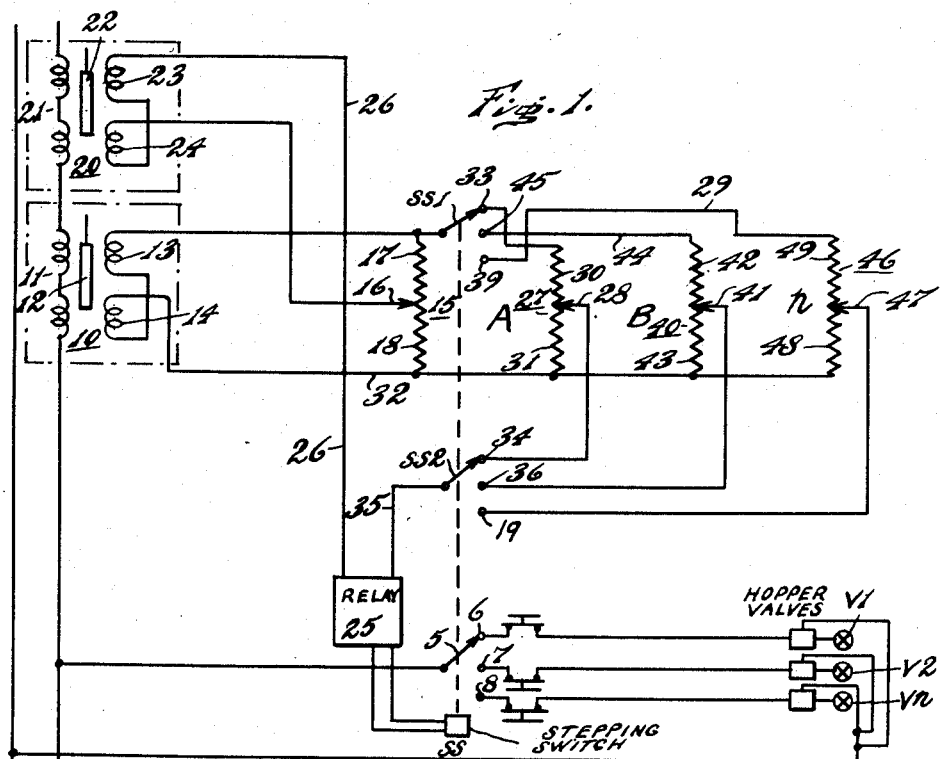
Fig. 1 represents a purely schematic diagram of the control circuitry utilizing a Wheatstone type of bridge, operative on both sides of null corresponding to the mid position of an associated scale head.

Referring to Fig. 1, a differential transducer, such as a differential transformer 10, is provided as a range coil, comprising an energizing primary winding 11, a manually adjustable and settable armature or core 12, and a secondary winding comprising a pair of secondary coils 13 and 14. The organization of the transformer is such that the secondary winding output is effectively a function of bucking voltages in the secondary coils, as taught, for instance, in U.S. patent to William D. Macgeorge No. 2,640,967, issued June 2, 1953. The transducer may to advantage be constructed in accordance with the teachings of U.S. application of William D. Macgeorge, for Differential Transducers, filed November 7, 1956, Serial No. 620,941. As illustrated, for convenience, the secondaries 13 and 14 are shown in bucking series relation. For convenience all transducers disclosed will be considered as similarly organized. A resistor 15 is provided, having a center tap 16, dividing the resistor into two legs 17 and 18, forming two arms, respectively, of the Wheatstone bridges to be described. The output of the secondary winding of the transformer 10 is across the respective ends of the resistor 15. A signalling differential transducer 20 is provided, comprising a primary winding 21, a movable armature 22, and a secondary winding comprising secondary coils 23 and 24 in effectively bucking series relation.

A relay 25 is provided, one input to which is a series connection 26 at one end of the secondary coils 24 and 23, with the other end in series connection to the center tap 16 of the resistor 15. To complete the first bridge, a first potentiometer 27 is provided, having a slider contact 28, which is manually adjustable in setting for predetermination of the given weight or condition with which the potentiometer is associated. The slider contact 28 divides the potentiometer 27 into two legs 30 and 31, which, when properly coupled to the resistor 15, effects a true Wheatstone bridge. The outer end of resistance leg 18 is connected to the outer end of leg 31 by a connector 32. The outer end of resistance leg 17 is connected to the outer end of leg 30, through a first stepping switch movable contact SS1 (sequentially progressed by stepping switch SS controlled by relay 25). When the switch movable contact SS1 is on the first fixed contact 33, the Wheatstone bridge A is completed, as the inner end of the contact 33 connects to the outer end of resistance leg 17.

A second potentiometer 40 is provided having a slider contact arm 41 dividing the potentiometer into bridge legs 42 and 43, and the outer end of the latter is connected across the outer end of the first potentiometer 27 to the outer end of leg 18, by connector 32, while the outer end of leg 42, through connector 44 terminates in fixed contact 45. When the stepping switch movable contact SS1 moves from fixed contact 33 it opens bridge A, and sequentially closes bridge B, comprised of resistance legs 17 and 18 and potentiometer legs 42 and 43. Any number of additional potentiometers can likewise be added. Thus, illustratively a potentiometer 46 is provided, divided by manually adjustable slider 47 into lower leg 48, joined to connector 32, an upper edge 49, connected by connector 29 to stepping switch fixed contact 39 and forming with resistance 15, Wheatstone bridge n.

The slider 28 of first potentiometer 27 leads to a contact 34 of stepping switch movable contact SS2, the inner end of which is the other input lead 35 to relay 25. The slider 41 of potentiometer 40, of bridge B, connects with second fixed contact 36 of the stepping switch SS2 and the slider 47 of potentiometer 46 connects with a third contact 19, of stepping switch SS2.

It will be understood that a third stepping switch (not shown) may be provided to by-pass the ingredient feed of the respective supplies of materials and that a fourth stepping switch movable contact 5 may be provided, operable relative to contacts 6, 7 and 8, to open and close respective valves V1, V2 and Vn controlling the respective ingredients of the batch.

It will also be understood that preferably the stepping switches are in a gang controlled by a single actuator SS, and the latter is operated by the relay 25.

The bridges A, B and n, are each established with relation to the common center-tapped resistor 15, according to the instant setting of the stepping switches. In each bridge organization the power therefor is externally applied by the output of the secondaries 13 and 14 of the range coil 10. In calibrating the system the stepping switches are so actuated as to establish bridge A, and the armature 10 of the range coil is displaced from its null median position, in an illustrative case a distance of the order of .1", toward either of the secondaries 13 or 14, which places a phased voltage of usefully high amplitude on each successive bridge, and powers same.

The operation of bridge A of Fig. 1, will be described, and it will be understood that the same functioning will take place with bridges B and n. With bridge A established by the proper positioning of the respective stepping switch contacts, it will be seen that neither of the differential transformers is in or forms part of the bridge. The bridge is formed by four resistive legs, into two portions separated by the center tap 16 on resistor 15, and by the slider contact 28 on the potentiometer 27, one portion comprised of legs 17 and 30 connected through switch SS1 and contact 33, and the other portion comprised of legs 18 and 31 joined by connector 32. By suitable displacement of the range coil armature 12 of differential transformer 10 the bucking secondary coils 13 and 14 thereof, induced voltages of respectively different phases and of different amplitudes effect a resultant signal of one phase and of desired amplitude impressed on bridge A to power same. In this connection the armature 12 is manually adjusted to effect the powering range coil output, and generally speaking, thereafter is fixed and immovable. With bridge A thus powered it will be seen that what may be considered as the bridge output signal per se, across tap 16 and slider 28, as the basic signal forming part of the ultimate input signal to the relay will be determined by the relation of the slider arm 28 on potentiometer 27. When it occupies a generally central location thereon, similar to the location of the center tap 16 on resistor 15, there will be substantially no signal. If at this time the condition-responsive armature 22 of the signalling transformer 20, coupled to or disposed in the scale head or connected to such other device as responds by motion to changes in condition of an associated variable, then the voltages induced in secondary coils 23 and 24 are equal, and being of opposite phases, are mutually cancelling, and the resultant input signal to the relay will be substantially null. In this form of the device it is preferred that the null output positioning of the armature 22, in centered relation to the respective secondaries 23 and 24, be coincident with the mid positioning of the weigh beam or indicator, mid way between zero scale reading and a maximum scale reading. The armature 22 is thus coupled to the scale so that at zero scale reading the output of the bucking secondaries is a maximum of one phase, with increase of applied weight the output progressively diminishes from such maximum until the signal is nulled, and with further increase of applied weight the signal increases from null to a maximum amplitude of the opposite phase at the limit of the scale.

With the armature thus coupled in the scale head, and no weight applied to the scale, and thus with a maximum signal output from the secondary coils 23 and 24, the resultant bridge signal on the relay will be a maximum. As bridge A is to predetermine weight of ingredient A or the first ingredient, to be applied to the scale, or to predetermine the change of condition of the associated variable, it will be understood that slider contact 28 will be displaced on potentiometer 27 to change the primary bridge output and thus the resultant signal on the relay to that value at which with application of weight on the scale or change of condition of the associated variable, the output of signalling transformer 20 will be so changed as to reduce the resultant input signal on the relay to substantial null or to that predetermined value at which the relay functions. The relay actuates the stepping switch, uncouples the potentiometer 27 from resistor 15, disrupting bridge A, and coupling potentiometer 40 to resistor 15, establishing bridge B, and closes valve V1, and opens valve V2 for the delivery of the second ingredient B, etc. Any desired sort of time delays can be utilized in the switching, as may be called for. It will be understood that each slider of each potentiometer will be manually displaced so as to predetermine the movement of the armature 22 that will effect actuation of the relay, and thus predetermine the weight of the ingredient, or the change in the variable to be predetermined.

It will be seen that for indication or control purposes a single bridge A as described has value, and, although it is preferred that the organization control the variable, as by applying the predetermined weight or the like, within the broader aspects of the invention this is not essential, as the change of condition may be from another source or agency, and the attainment of the predetermined condition can actuate the relay as a signal of such attainment. However, in general, it is preferred that the unbalance or variation of the resultant signal be used to effect the change in condition, as illustrated.

In the usual case the batching starts with no weight on the scale, and the datum for the signalling transformer is from such no-weight attitude, corresponding to zero on the scale. This is the usual case for bridge A. It is also the usual case that the settings of bridge B are with the attained weight of ingredient A on the scale as a datum, and so on. However, it will be understood that in case the scale is suitably actuated as to dump ingredient A before receiving ingredient B and so on, that the adjustments of the slider contacts on the potentiometers 40 and 46, will be with reference to a datum signalling transformer output consonant with an unloaded scale.

Figure 2:
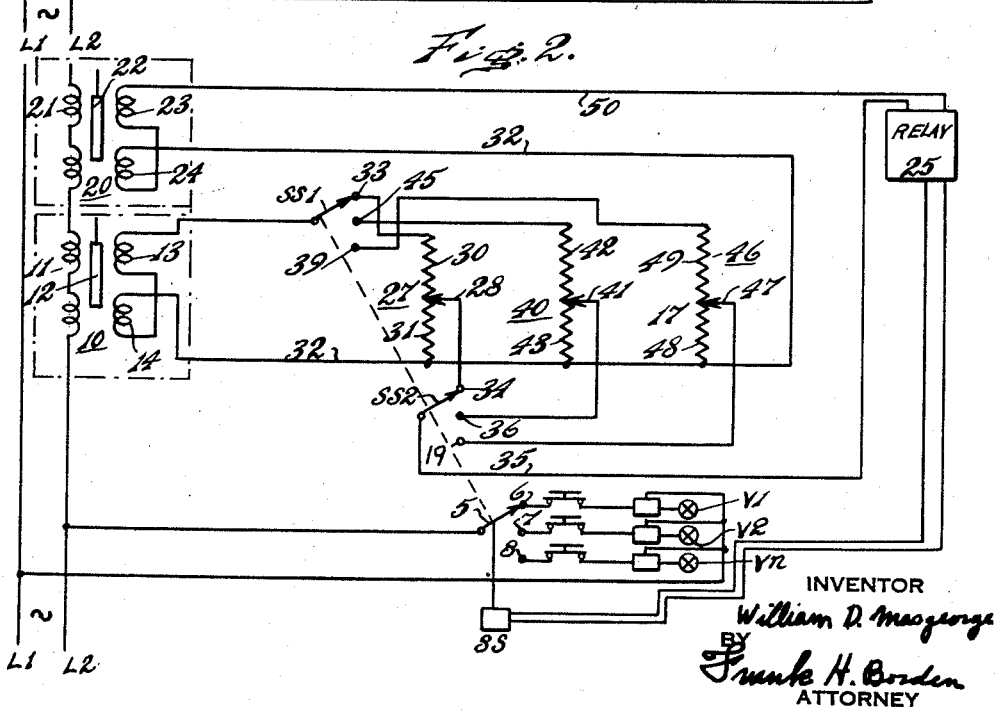
Fig. 2 represents a modification of the circuitry of Fig. 1, utilizing a voltage divider, operative on one side of null adjusted from the zero point of an associated scale head.

An important modification of the circuit of Fig. 1 is schematically outlined in Fig. 2. In this case all of the like components in both figures are similar and bear the same reference characters, except, and fundamentally the circuit of Fig. 2 does not incorporate a bridge. The basic bridge-forming resistor 15 of Fig. 1 is omitted and the output connections are rearranged. In Fig. 2 the circuit incorporates a voltage divider as the signalling organization.

The secondary winding, comprising the bucking secondary coils 13 and 14 of the range coil 10, connects across and is shunted by the respective potentiometers 27, 40 and 46, selectively individually brought into and out of the circuit by the stepping switches. As the circuit incorporating potentiometers 40 and 46 functions similarly, consider the case of potentiometer 27 shunting the leads from the secondaries of the range coil 10. With the armature 12 suitably displaced as before to produce a secondaries output of given phase and desirable amplitude, the location of the slider contact 28 on the potentiometer 27 will determine the signal between the slider 28 and the connection 32 at one end of the potentiometer 27. This is the predetermined signal set in the circuit, according to the position of the slider contact 28.

To form the resultant signal on the relay 25, the connector 32, on one side of the potentiometer 27, is in series with the bucking secondaries 23 and 24 of the condition responsive differential transformer. One lead 50, from these secondaries goes to the relay 25. The slider contact 28 of the potentiometer 27 forms the other input lead to the relay.

In this case, however, preferably, the movable element of the scale head is connected to the armature 22 so that the latter is in the null balance mid position, when the scale indicator is at zero on the scale. With this setting, all motion of the armature 22 in response to changes in the applied load is in one sense relative to the secondary coils, so that the progressively increasing output from the signalling transformer is of one phase but of varying amplitude according to the displacement of the armature. The settings of the potentiometers and the resultant relay actuations are similar to that described of Fig. 1, except that, as noted, in Fig. 2, there is no bridge circuit, and the adjustment of the signalling transformer is from substantial null in one sense.

It will be understood that for certain purposes the relay 25 may be replaced by an amplifier unit, such as is conventional in the art, although for simplicity and economy, a relay may be preferred.

I claim as my invention:

1. In a control circuit of the class described, a potential-responsive device, a first and a second differential transformer each comprising a primary, a core, and two secondary coils connected in series bucking relation to a pair of output terminals, a first potentiometer connected in shunting relation to the series connected secondary coils of said first differential transformer and having a slider contact forming one input to said potential-responsive device, a second potentiometer also connected in shunting relation to the series connected coils of said first differential transformer, one output terminal of said second differential transformer being connected to said potential responsive device and the other output terminal thereof being connected to the slider of said second potentiometer, whereby said first and second potentiometers form a bridge circuit between the secondaries of said transformers.

2. The control circuit defined by claim 1 including a plurality of individually adjustable potentiometers in combination with remotely operable switching means controlled by said potential-responsive device for selectively connecting any one of said potentiometers into said bridge circuit as said first shunting potentiometer.

3. The combination defined in claim 2 further defined in that one of said differential transformers is actuated by a weighing scale and said switching means also controls means for feeding a plurality of ingredients to said weighing scale.

4. In a control circuit activated by a physical displacement, the combination comprising, a first differential transformer having two secondaries connected in series bucking relation producing a displacement signal, a second differential transformer having two secondaries connected in series bucking relation producing a reference signal, a plurality of voltage dividers of substantially equal total resistance forming a plurality of bridge circuits each having two end terminals and a movable tap terminal, a plurality of output circuits controlled by the control circuit, a null detecting relay and a stepping switch, one of said transformer signals being applied across each of said bridge circuits in turn by means of said stepping switch, said applied signal as modified by each of said bridge circuits being algebraically added in turn to the other of said transformer signals by means of said stepping switch, the signal resultant of said addition being applied to the control terminals of said null detecting relay which is adapted to apply a stepping signal to said stepping switch when said resultant signal is substantially at null, said stepping switch controlling the selection in turn of each of said output circuits and maintaining a correspondence between said voltage dividers and output circuits whereby said voltage dividers may be preset to cause the selection of each of said output circuits at a predetermined physical displacement.

5. The combination of claim 4 further defined in that said first differential transformer is actuated by a weighing scale and said output circuits control means for successively feeding a selected plurality of ingredients to said weighing scale.

References Cited in the file of this patent

UNITED STATES PATENTS

| | | |
|---|---|---|
| 502,399 | Haskins | Aug. 1, 1893 |
| 2,445,682 | Macgeorge | July 20, 1948 |
| 2,564,221 | Hornfeck | Aug. 14, 1951 |
| 2,611,812 | Hornfeck | Sept. 23, 1952 |
| 2,632,599 | Hornfeck | Mar. 24, 1953 |